(12) United States Patent
Petromanolakis

(10) Patent No.: US 12,084,149 B2
(45) Date of Patent: Sep. 10, 2024

(54) VESSEL WITH A HYDRODYNAMIC DUCT OF FLOW MANAGEMENT MOUNTED ON THE BOW THEREOF WITH A HORIZONTAL WALL PORTION OF SURFACE WAVE MANAGEMENT

(71) Applicant: Emmanuel E. Petromanolakis, Athens (GR)

(72) Inventor: Emmanuel E. Petromanolakis, Athens (GR)

( * ) Notice: Subject to any disclaimer, the term of this patent is extended or adjusted under 35 U.S.C. 154(b) by 424 days.

(21) Appl. No.: 17/434,047

(22) PCT Filed: Feb. 28, 2020

(86) PCT No.: PCT/GR2020/000016
§ 371 (c)(1),
(2) Date: Aug. 26, 2021

(87) PCT Pub. No.: WO2020/174256
PCT Pub. Date: Sep. 3, 2020

(65) Prior Publication Data
US 2022/0135183 A1    May 5, 2022

(30) Foreign Application Priority Data
Feb. 28, 2019  (GR) .............................. 20190100102

(51) Int. Cl.
*B63B 1/06*   (2006.01)
*B63B 1/26*   (2006.01)
(Continued)

(52) U.S. Cl.
CPC .................. *B63B 1/40* (2013.01); *B63B 1/06* (2013.01); *B63B 1/26* (2013.01); *B63B 39/06* (2013.01)

(58) Field of Classification Search
CPC .... B63B 1/40; B63B 1/06; B63B 1/26; B63B 39/06; B63B 1/32; Y02T 70/10
See application file for complete search history.

(56) References Cited

U.S. PATENT DOCUMENTS 1,258,554 A * 3/1918 Furness ..................... B63B 1/38
                                                    114/67 R
3,651,775 A * 3/1972 Kock ........................ B63B 1/24
                                                    114/274

(Continued)

FOREIGN PATENT DOCUMENTS

CN          1148834 A      4/1997
CN        105263795 A      1/2016

(Continued)

*Primary Examiner* — Andrew Polay

(57) ABSTRACT

Vessel equipped with a hydrodynamic duct of flow management at the bow composed by a horizontal wall portion (2) extending at each side of the centerline (CL) of the bow of the vessel (8), at least one additional horizontal wall portion (1) positioned above the horizontal wall portion (2) at the region of the waterline adapted to managing surface waves and a pair of lateral wall portions (5) connected at each end of the horizontal wall portions (1) and (2) and extending upwardly at each side of the bow thereby forming in conjunction with the horizontal wall portions (1) and (2) a circumferentially closed duct, inside which, the flow is entirely differentiated from the flow outside the duct, such differentiation resulting at a reduction of the wave making resistances and of the required rated horsepower and fuel consumed for the navigation of the vessel. Proposed variations with one additional horizontal wall portion (3) or two wall portions (3,4) between the horizontal wall portions (1) and (2) operating complementarily or alternately in an unloaded and loaded condition of the vessel.

9 Claims, 9 Drawing Sheets

(51) Int. Cl.
 *B63B 1/40* (2006.01)
 *B63B 39/06* (2006.01)

(56) References Cited

U.S. PATENT DOCUMENTS

| | | | | |
|---|---|---|---|---|
| 2006/0169191 | A1* | 8/2006 | Loui | B63B 39/06 |
| | | | | 114/274 |
| 2014/0150704 | A1* | 6/2014 | Petromanolakis | B63B 1/06 |
| | | | | 114/274 |
| 2015/0344106 | A1* | 12/2015 | Petromanolakis E. | B63B 1/40 |
| | | | | 114/271 |
| 2018/0162489 | A1* | 6/2018 | Van Diepen | B63B 1/04 |

FOREIGN PATENT DOCUMENTS

| | | | |
|---|---|---|---|
| DE | 682004 | | 10/1939 |
| GR | 20110100430 | | 7/2011 |
| GR | 20120100643 | A1 | 7/2014 |
| JP | 5012674 | B1 | 5/1975 |
| JP | 1120775 | A | 1/1999 |
| JP | H1120775 | A * | 1/1999 |
| JP | 2014522778 | A | 9/2014 |
| KR | 20130055994 | A * | 5/2013 |
| KR | 20160027545 | A * | 3/2016 |
| KR | 20160149747 | A * | 12/2016 |
| RU | 2238873 | C2 | 12/2004 |
| WO | 9222456 | A1 | 12/1992 |
| WO | 9626104 | A1 | 8/1996 |
| WO | 2013011332 | A1 | 1/2013 |
| WO | 2014091259 | A1 | 6/2014 |

* cited by examiner

VESSEL WITH A HYDRODYNAMIC DUCT OF FLOW MANAGEMENT MOUNTED ON THE BOW THEREOF WITH A HORIZONTAL WALL PORTION OF SURFACE WAVE MANAGEMENT

THE FIELD OF THE ART

The present invention refers to the technical field of hydrodynamics, and in particular to a vessel equipped with a hydrodynamic duct mounted at the bow thereof for the management of water flow during vessel sailing, the duct being composed of two lateral wall portions, one lateral wall portion at each side of the bow of the vessel, the two lateral wall portions being connected with at least one lower and one upper wall portion that extends horizontally or at a certain inclination, wherein the water flow at the bow of the vessel in the interior of the duct is differentiated from the flow in the exterior of the duct, such differentiation resulting in a reduction of wave making and frictional resistances and as a consequence a reduction of fuel consumption required for the propulsion of the vessel. Further, the upper horizontally extended wall portion acts cooperatively with the wave vectors on the sea surface and causes an increase of the speed of the wave incident at the leading edge of this upper horizontally extended wall portion, such increased speed of the wave at the sea surface resulting in a further increase of the flow speed and drop of the pressure exerted onto the bow and consequently leading at a decrease in the resistance being encountered by the vessel in the propulsion thereof. Bow geometry (a conventional or a bulbous bow) and loading requirements of the vessel are taken into account in designing the proposed hydrodynamic duct with a scope of achieving an optimally reduced resistance during propulsion of the vessel and consequently achieving a reduction in fuel consumption.

THE BACKGROUND OF THE INVENTION

The hydrodynamic duct of flow management and particularly this of confronting the wave making resistances during propulsion of the vessel has been the subject of a series of international applications and granting of dozens of national patents in the last decades. With the international application WO 1992/22456 was proposed a first design of such a duct and with the international application WO 1996/26104 was proposed this duct to have two lateral wall portions connected to a horizontal wall portion, all such wall portions having an aerofoil section. Thereafter, the international applications WO 2013/011332 and WO 2014/091259 proposed significant structural improvements on this duct for maximizing its performance.

It is well known that in the field of shipbuilding of all types of vessels, the reduction of energy consumption gains increasingly significant importance in combination with the raising awareness of environmental issues and the appearance of hazardous phenomena caused by the climatic change. It is further known that wave making and frictional resistances constitute an essential factor that determines the level of fuel consumption during propulsion of a vessel, the importance of this factor being evidenced by the consistent and extensive efforts for achieving a reduction of such resistances encountered by vessels and improve their propulsion through the solid mass of water they come across. By way of example, a bulb or ball configuration of a part of the hull in the bow of a vessel has been widely used in the past to reduce wave making resistance and especially with the scope of reducing the height of the bow wave. However, the frontal surface of the vessel, i.e. the surface area of the bow that comes in contact with water during propulsion of the vessel is a substantially extensive area, and as the propulsion resistance is proportional to an enhanced value of the square of the speed of the vessel, even more enhanced is the increase of the horsepower required to overcome the propulsion resistance and provide propulsion of the vessel at the rated speed for which it has been designed, since such horsepower is proportional to the cube of the speed of the vessel.

For dealing with this problem of achieving a reduction in the propulsion resistance, i.e. in the wave making energy that is being created by the pressure being exerted onto the bow frontal surface of the vessel, the addition of a duct mounted at the bow of the vessel was, as mentioned hereinabove, disclosed in the International patent application WO-92/22456 (E. E. Petromanolakis), such duct extending in-height above and below the waterline of the vessel and aiming at achieving a reduction of the wave making resistance during propulsion of the vessel through reduction of the pressure being exerted on the bow being achieved because of the vessel impacting onto the water mass through the duct and not through the entire frontal bow surface thereof. An improved version of such a duct, damper of the pressures being exerted on the bow and consequently reducer of the fuel consumption required for the propulsion of the vessel is, as mentioned hereinabove, disclosed in the subsequent international patent application WO-96/26104 (E. E. Petromanolakis), such improved duct having walls with an aerofoil section and providing maximization of the differentiation of the flow through the duct in relation to the flow of water around the same, such enhanced differentiation resulting in a beneficial increase in fuel saving.

Thereafter, according to the Greek patent application GR-20110100430 and the subsequent international patent application WO-2013/011332, the duct is being proposed to being arranged with the Center of Low Pressure corresponding to a zero angle of incidence of the flow onto the horizontal wall portion being located in the region of generation of the first bow wave and with the Centers of Low Pressure of the lateral wall portions thereof in the region of connection thereof with the horizontal wall portion being arranged in a selected position between the Center of Low Pressure of the horizontal wall portion and up to or slightly forwardly the leading edge thereof. Furthermore, with a scope of optimizing the design of the duct, selective combinations in the structural characteristics of the horizontal wall portion and of the lateral wall portions have been proposed, the determinants of the lift coefficient ($C_L$) and of the drag coefficient ($C_D$) parameters of the geometry of the wall portions have been studied and solutions have been proposed that aim at obtaining optimization of the ratio $C_L/C_D$ of the lift coefficient $C_L$ to the drag coefficient $C_D$ both for the horizontal wall portion and for the lateral wall portions of the duct, and further obtaining an optimized ratio of the lift coefficient of the lateral wall portions in correspondence with the specific nominal speed of navigation of the vessel and the geometry of the bow. The parametrical design of the duct proposed hereinabove led to significant improvement in performance, such improvement having been confirmed by tests that have been successfully conducted on vessel models of different types (containers, bulk carriers, yachts and frigates).

Furthermore, the subsequent Greek patent application GR-20120100643 and the international patent application WO-2014/091259 that claimed the priority thereof proposes the parametrical design of the duct in correlation with information relevant to the configuration and geometry of each specific bow and further in correlation with varying loading requirements of the vessel. In the other way around, the design of the bow was proposed to be implemented with the scope of mounting an optimized duct therein, the focus being on the achievement of improved results with regard to the horsepower propulsion requirements and to the fuel consumption. Specifically, an arrangement of the duct has been proposed with the horizontal wall portion being adapted to move vertically between an upper extreme position and a lower extreme position, and the lateral wall portions having a configuration that would, at any position taken by the vertically displaceable horizontal plane passing through the waterline, render a horizontal cross-section of the lateral wall portions along the horizontal plane passing through the waterline to follow the geometry and in particular the flare of the bow with the trailing edge of each horizontal cross-section of the lateral wall portions being maintained at a fixed distance from the side walls of the bow, such fixed distance being defined by the perpendicular from the trailing edge of the lateral wall portions that corresponds to each particular waterline level to the sides of the bow.

The aforementioned research effort of the duct mounted at the bow of the vessel has been contributing on an economically advantageous propulsion of vessels and has also achieved a reduction of accelerated vertical movements of the bow thereby leading at higher average speeds of cruising. Exceptionally beneficial results are obtained with the last aforementioned patent application wherein the parametrical design of the duct is correlated with the particular parametrical design of the bow of the vessel onto which it is mounted.

It has been well founded that with the use of the proposed hydrodynamic duct mounted at the bow of a vessel entirely immersed below the waterline during sailing of the vessel, the duct being composed of a horizontally extending wall portion and two lateral wall portions, the goal of achieving an optimally advantageous differentiation of the flow within the duct in comparison with the flow outside it and accordingly achieving a reduction of the pressures being exerted onto the bow is being accomplished, and consequently the wave making resistance, i.e. the resistance during the sailing of the vessel is reduced with a subsequent desired reduction in fuel consumption.

However, the immersion of the duct below the waterline and the open upper end thereof lead to an ineffective management of the wave being produced on the sea surface, thereby resulting in an incomplete management of the wave making resistance and in a limited overall efficiency of the proposed hydrodynamic duct that is mounted at the bow of the vessel.

It is therefore an object of the present invention to propose the hydrodynamic duct being provided with an additional at least one upper horizontal wall portion, which is arranged above the immersed horizontal wall portion of the duct, said additional at least one horizontal wall portion being located at the region of the waterline and being adapted to produce absorption of wave energy being due to an increase of the speed of flow incident on the leading edge of the additional upper horizontal wall portion. The introduction of the abovementioned additional at least one upper horizontal wall portion results in broadening the differentiation of the flow inside the duct from the flow outside it and this leads to the combination of the lower horizontal wall portion at the proximity of the bottom of the duct with the horizontal wall portion arranged at the proximity of the waterline providing a cumulatively increased reduction of the wave making resistances, such reduced wave making resistances necessitating an accordingly decreased horsepower and fuel consumption for the propulsion of the vessel, such abovementioned improvement in the efficiency of the duct being provided with the aforementioned additional upper wall portion in the region of the waterline being notably significantly enhanced under conditions of turbulent sea and augmented wave making.

It is a further object of the present invention to propose an advantageous orientation of the additional at least one upper horizontal wall portion of the hydrodynamic duct in the region of the waterline and preferably above the waterline for low-speed vessels having a wide bow wherein the bow wave is manifested upstream the bow centerline and below the bow centerline for high-speed vessels having a narrow bow wherein the bow wave is manifested onto the bow centerline or downstream thereof.

A further object of the present invention is to propose the additional at least one upper horizontal wall portion of the hydrodynamic duct with technical characteristics of an airfoil section (chord length, thickness, camber, etc.) such that it may be adapted to cooperate with the vectors of the surface waves produced by the sea in order to achieve an increase of the inlet velocity of the flow incident onto the leading edge of the abovementioned at least one upper horizontal wall portion, thereby achieving a further increase of the inlet flow and accordingly a further reduction of the pressure exerted thereupon, i.e. achieving an improved propulsion of the vessel.

Another object of the present invention is the determination of the parameters of the abovementioned at least one upper horizontal wall portion taking into account criteria of the speed of navigation and of the configuration of the bow and the proposal of said upper horizontal wall portion with a capacity of forward or backward movement along the longitudinal direction of the vessel for the modification of the angle of incidence of the flow thereupon.

An object of the invention also is to propose variable parameters of the airfoil section of the upper horizontal wall portion of the hydrodynamic duct, such variation being related to a varying speed of navigation and varying configuration of the bow of the vessel.

Another object of the invention is to offer the possibility, with the scope of improving performance of the duct, of an extension of the horizontally extending and of the lateral wall portions of the duct, such extension being accomplished with a covering sheet that is adapted to desirably extend forwardly the leading edge of the abovementioned wall portions thereby expanding the effect of the closed duct on the wave making resistances when required, e.g. due to a change of weather conditions that leads to a change of the height of the bow wave and/or due to alteration of the navigation speed of the vessel.

Another object of the present invention is to propose an arrangement of the lateral wall portions of the duct that,
    according to a first embodiment of the invention, have their horizontal cross-section following the geometry of the flare of the bow with the trailing edge of each horizontal section of the lateral wall portions maintained at a fixed distance from the side walls of the bow, such fixed distance being defined by the perpendicular from the trailing edge of the lateral wall portions that corresponds to each particular cross-section to the sides of the bow;
    according to a second embodiment of the invention that may produce an advantageous effect under certain circumstances, the lateral wall portions deviate at a certain inclination with respect to the side walls of the bow, either throughout the height of the duct from the lower horizontal wall portion at the bottom of the duct up to the waterline, or partially along either an upper or a lower portion of the height of the duct, wherein if the lateral wall portions deviate from the side walls of the bow, either throughout the height of the duct or along a portion thereof, the resulting vortices being created due to the gradually increasing distance of the lateral wall portions from the side walls of the bow may be counteracted and damped due to the increased effect of the vectors being created due to the existence of said additional at least one horizontal wall portion, wherein an appropriate combination of lateral wall portions which are either arranged at said fixed distance from the bow side walls or gradually deviate from the bow side walls results in achieving an increased efficiency of the hydrodynamic duct as provided by the reduction in rated horsepower and in fuel consumption during the propulsion of the vessel being equipped with said duct, as well as the optimization of the undesirable vertical movements of the bow.

It is further acknowledged that the draught of the vessel is significantly modified depending on the level of loading thereof, wherein an unloaded vessel exhibits a minimal draught and the vessel in fully loaded condition shows a maximum draught.

Based on the aforementioned, in order for the proposed hydrodynamic duct mounted at the bow to be suitable for any loading condition of the vessel whatsoever, another object of the present invention is to propose such a duct in a layout of continuous lateral wall portions that follow the configuration of the bow maintaining a fixed distance from the side walls thereof at all levels or gradually deviate from these side walls, either throughout their length from their bottom to their top section or partially along a portion of such length from bottom to top, a first pair of horizontal wall portions being connected at the lower part of the lateral wall portions thereby forming a lower circumferentially closed first duct portion and another second pair of horizontal wall portions being connected at the upper part of the lateral wall portions thereby forming an upper circumferentially closed second duct portion, wherein the lower first duct portion is adapted for managing the flow at the bow and provide the aforementioned advantageous effects of reduction of wave resistances during propulsion of the vessel without load, whilst the upper second duct portion is adapted for managing the flow at the bow and provide, with the assistance of the abovementioned first duct portion, the aforementioned advantageous effects of reduction of wave resistances during propulsion of the vessel in fully load condition.

A further object of the invention is to propose the circumferentially closed hydrodynamic duct of the invention with a lower portion and an upper portion, the duct provided with three horizontal wall portions, wherein the intermediate horizontally extending wall portion constitutes the wall portion that is adapted to manage surface waves when the vessel is in an unloaded condition.

Another object of the invention is to offer the possibility of vertical displacement along the vertical of at least one of the horizontally extending wall portions and specifically to provide such capacity to the one that is adapted for handling surface wave in order for this one to be located at an advantageous position for surface wave management that would provide an optimized beneficial influence of the duct under varying conditions of draught of the vessel that depend on the loading thereof and on the consumption of consumables.

Another object of the invention is to propose an embodiment in which the upper and/or the lower horizontally extending wall portions of the hydrodynamic duct is oriented at a certain inclination, upwardly or downwardly, relatively to the horizontal level of the waterline on either side of the axis of symmetry of the vessel.

Another object of the invention is to propose at least one or more additional wall portions that extend parallel and underlying the lower wall portion of the duct that extends horizontally or at a certain inclination, wherein this at least one or more wall portions have the same or different airfoil section with the lower horizontal or inclined wall portion, wherein the space between the lower wall portion and the underlying additional wall portion or portions is covered by lateral wall portions, wherein the object of the proposed additional one or more wall portions is the increase in the speed of the incoming flow to the duct of the invention and therefore the enhanced further diversification of the characteristics of flow within the duct from the flow outside the same.

Another object of the invention is to propose an embodiment in which the proposed circumferentially closed duct is mounted in vessels with a bulb, wherein the lower horizontally extending wall portion is arranged so that the bulb configuration is contained within the abovementioned circumferentially closed duct, such arrangement providing an enhanced efficiency due to the combined effects of the bulb and of the duct of the invention. It is specifically herein noted that it has been observed that a vessel equipped with a bulb exhibits a certain improvement in its navigation efficiency whilst it travels within the limits of the nominal speed thereof, but it presents a significantly reduced efficiency below these limits of its nominal speed due to concurrent change of Fn. It is therefore an object of the invention to propose the aforementioned combination of a bulb with the duct of the invention mounted at the bow of a vessel with a scope of ensuring an adequate efficiency independently of the speed of navigation of the vessel, since it has been found that the duct provides its advantageous effects at all values of Fn including speeds inferior than the designed nominal speed (economic speed).

More particularly, an object of the invention is to propose combining the bulb at the bow of a vessel with the hydrodynamic duct of the invention in an embodiment wherein the lower horizontal wall portion extends on either side of the bulb body at a selected height thereof and in another embodiment wherein the lower horizontal wall is being substituted by the upper surface of the bulb body, whilst in either of the abovementioned embodiments the upper horizontal wall portion adapted to provide surface wave management is appropriately located above the bulb body in the region of the waterline.

It is therefore a main object of the present invention to efficiently overcome the aforementioned drawbacks and deficiencies of the prior art and to propose structural design parameters of the hydrodynamic duct that is mounted at the bow of a vessel that will allow optimization of the duct performance in conjunction with the functionally interdependent parameters of the speed of the vessel, the geometry of the bow of the vessel, as well as with the varying loading conditions thereof.

These and other objects, characteristics and advantages of the present invention will become apparent in the detailed description of preferred embodiments.

BRIEF DESCRIPTION OF THE DRAWINGS

The invention will be fully disclosed to those skilled in the art by reference to the accompanying drawings in which it is being presented in an illustrative and non restrictive manner.

FIG. 9a shows a perspective view of an embodiment of the invention wherein the hydrodynamic duct is provided in a vessel with a bulbous bow and the lower horizontal wall portion is the upper surface of the bulb, whereas

DETAILED DESCRIPTION OF PREFERRED EMBODIMENTS

Illustrative preferred embodiments of the invention will be presented hereinafter with reference to the accompanying drawings.

Figure 1:
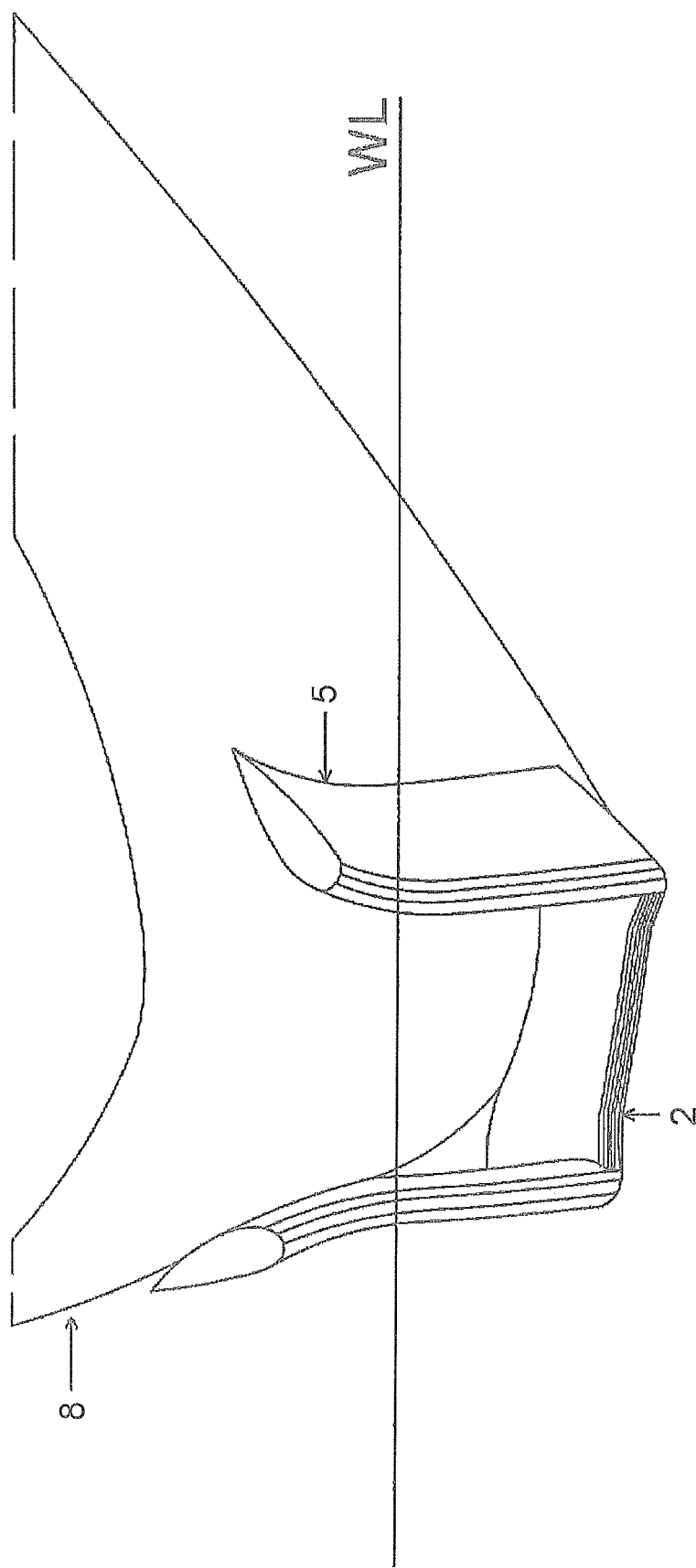
FIG. 1 presents a partial perspective view of a vessel bow with a hydrodynamic duct of the prior art mounted thereupon, wherein the duct comprises a horizontal wall portion and a pair of lateral wall portions that are shown extending above the waterline.

FIG. 1 shows a hydrodynamic duct of the prior art comprising a pair of lateral wall portions 5 extending at the proximity of the side walls of the bow of a vessel 8, wherein a bottom end of these lateral wall portions 5 is connected at the ends of a horizontally extending wall portion 2.

Figure 2:
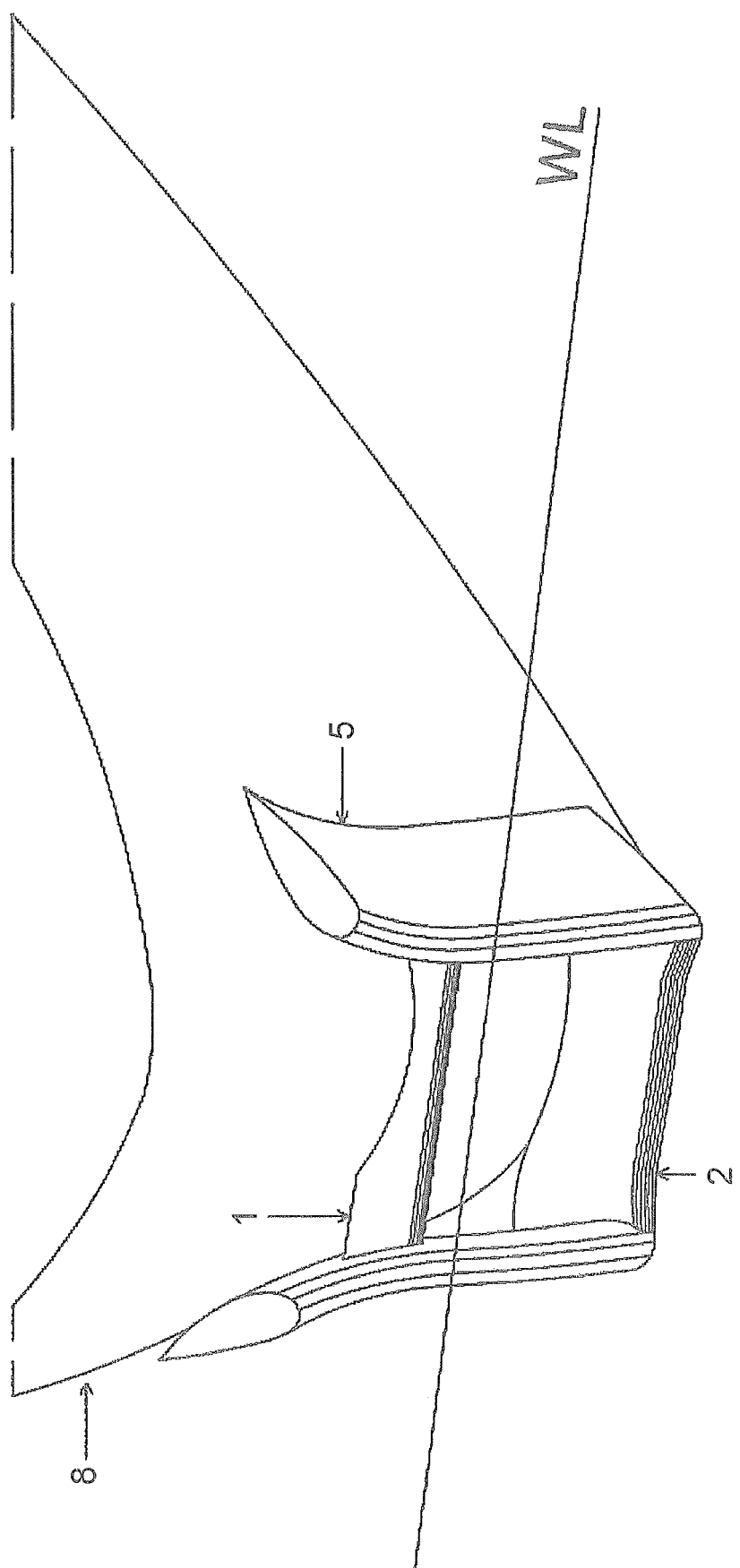
FIG. 2 presents a perspective view of a part of a vessel bow with the hydrodynamic duct of the present invention mounted thereupon, wherein the duct is composed of a lower horizontal wall portion, an upper horizontal wall portion and lateral wall portions that are shown extending above the waterline.

FIG. 2 shows an illustrative embodiment of the circumferentially closed hydrodynamic duct of the present invention, which, further to the aforementioned structural elements of a pair of lateral wall portions 5 connected at their bottom with a horizontally extending wall portion 2 of the prior art, comprises another horizontally extending wall portion 1 with ends also connected to the upwardly extending lateral wall portions 5, wherein the upper horizontally extending wall portion 1 is arranged in the region of the waterline (WL) with a scope of an efficient management of the wave at the sea surface during sailing of the vessel.

The proposed upper horizontally extending wall portion 1 cooperates with the vectors of the waves at the sea surface to produce an increase of the speed of the wave that flows through the leading edge of this horizontally extending wall portion 1, such speed increase resulting on a pressure drop and on a desirable drop of the resistances encountered drop in the movement of the vessel. The effect of the proposed horizontally extending wall portion 1 of surface wave management is particularly important and the efficiency thereof is significantly increased under conditions of a turbulent sea since, whilst under conditions of a calm sea the flow vectors generally extend parallel to the surface of the bow wave, under conditions of turbulent sea the flow vectors have multiple varying directions at varying slopes, such varying flow vectors comprising vector components extending along the vertical that tend to cancel each other, however their existence resulting at a reduction of the intensity of vector components that extend in the direction of movement of the vessel. Thus, under conditions of a turbulent sea, the cooperation of the flow vectors that extend in the direction of movement of the vessel and have a reduced intensity with the upper horizontally extending wall portion 1 results in a substantially improved performance of the hydrodynamic duct of the present invention.

Figure 8:
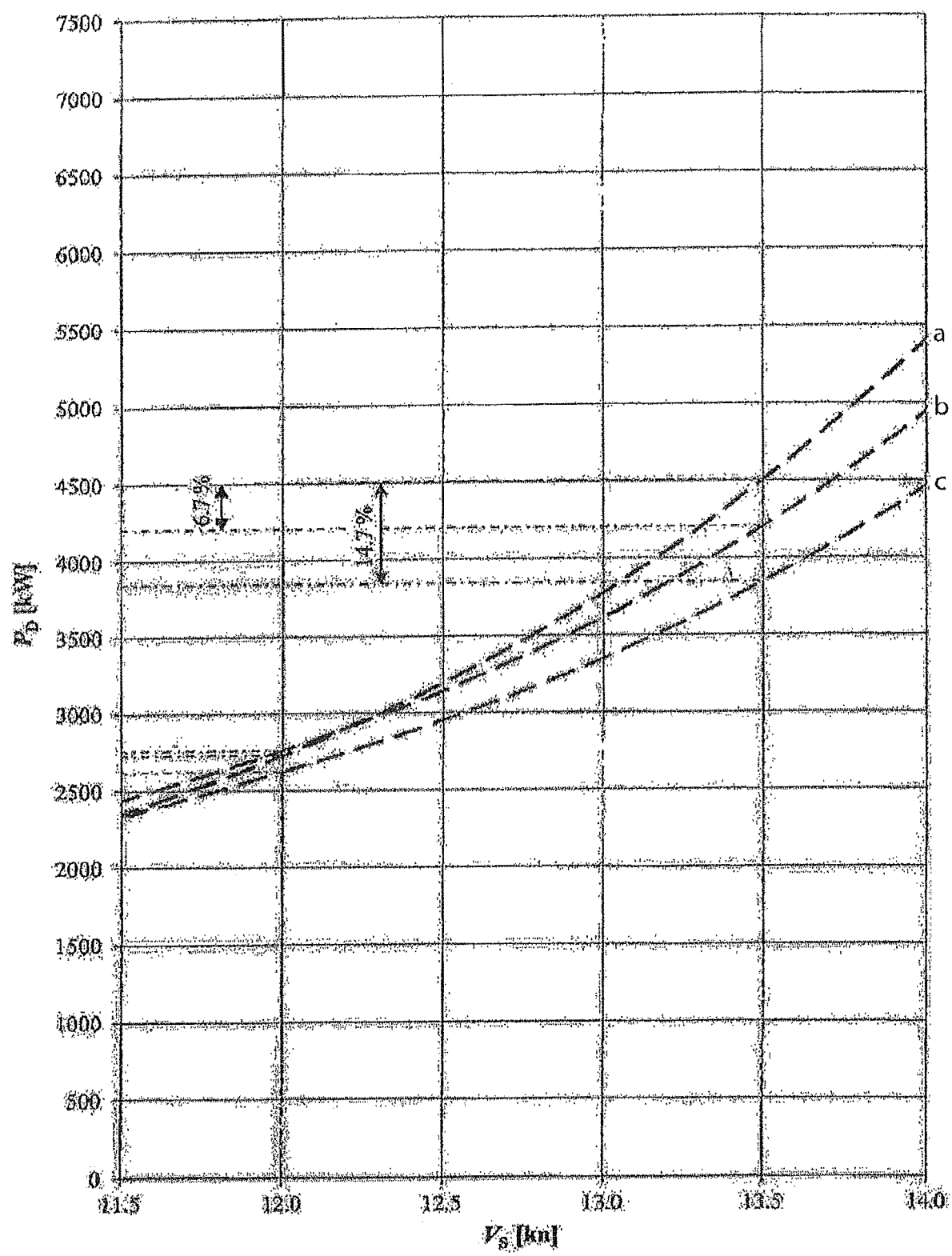
FIG. 8 presents a diagram of the horsepower rated for the propulsion of a vessel in KW against the nominal speed in knots of the vessel, wherein line a) presents the case of a vessel without hydrodynamic duct at the bow, line b) the case of a vessel with a hydrodynamic duct of the prior art at the bow and line c) the case of a vessel with the hydrodynamic duct of the present invention mounted at the bow thereof.

The improved performance of the hydrodynamic duct of the present invention against the hydrodynamic duct of the prior art that does not include the horizontally extending wall portion 1 of management of the surface wave is made clearly apparent from the diagram of FIG. 8 wherein is presented the consumed power (KW) against the vessel speed (knots) under conditions of turbulent sea (4 Beaufort). FIG. 8 illustrates the case of a vessel with a naked hull without a duct (curve a), the case of the vessel provided with a duct of the prior art without an upper wall portion of management of the surface wave (curve b), and the case of the present invention, i.e. of the vessel provided with a duct that additionally comprises the upper wall portion of management of surface wave (curve c). The above diagram has been obtained from tests carried out in Potsdam Model Basin with a model vessel of a bulk carrier (bulk carrier Sea Horse 35). This horsepower diagram clearly demonstrates the improvement with the duct of the present invention (curve c) that provides a reduction of power consumption by a percentage of 14.70% against a vessel of naked hull (curve a) at a sailing speed of 13.5 knots. The duct of the prior art (curve b) also exhibits an improvement in comparison with the same vessel of naked hull (curve a), however substantially decreased at a percentage of 6.70% with the vessel sailing at the same speed of 13.5 knots. The above illustrative diagram therefore clearly demonstrates the improvement in the efficiency of the hydrodynamic duct provided with the additional horizontally extending wall portion of management of surface wave as this is disclosed in the present invention.

As mentioned hereinabove, a significant improvement in the performance of the hydrodynamic duct is obtained under turbulent sea conditions with the vessel sailing at relatively upper speed limits; In this respect it is noted that the sailing speed of the model in the aforementioned test was indeed in the region of the upper limits, i.e. had a value of 13.5 knots. It should herein be noted that many times, in the absence of means capable to provide management of wave resistances on the bow, such as this of the hydrodynamic duct of the invention, thereby not achieving a concurrent fuel reduction, it may be decided in order to have a reduced fuel consumption to have the vessel navigating at a speed inferior to that of its potential, e.g. for the vessel of the present test at lower speeds of the order of 11-12.5 knots. This reduction results indeed to a certain saving of fuel and costs; however, this saving is annihilated partly because of the increased operational costs of the vessel and possibly also renders the charter non-competitive at the aforementioned reduced speed since it is necessarily accompanied by prolonged delivery time periods.

Further, it is for various reasons possible to have a demand of an accelerated navigation of the vessel either for a quick delivery of a certain load or for an accelerated arrival to a specific port for undertaking a new cargo assignment. In these cases, the presence of the hydrodynamic duct of the invention allows navigation of the vessel at maximum rated speeds and offers a significant fuel saving that balances the increased fuel consumption that is due to the elevated speed of navigation. Thus, it is evident that providing a vessel with the duct of the invention constitutes an advantageously profitable investment that proves very efficient because of the fuel saving obtained within a significantly limited time period.

Figure 4:
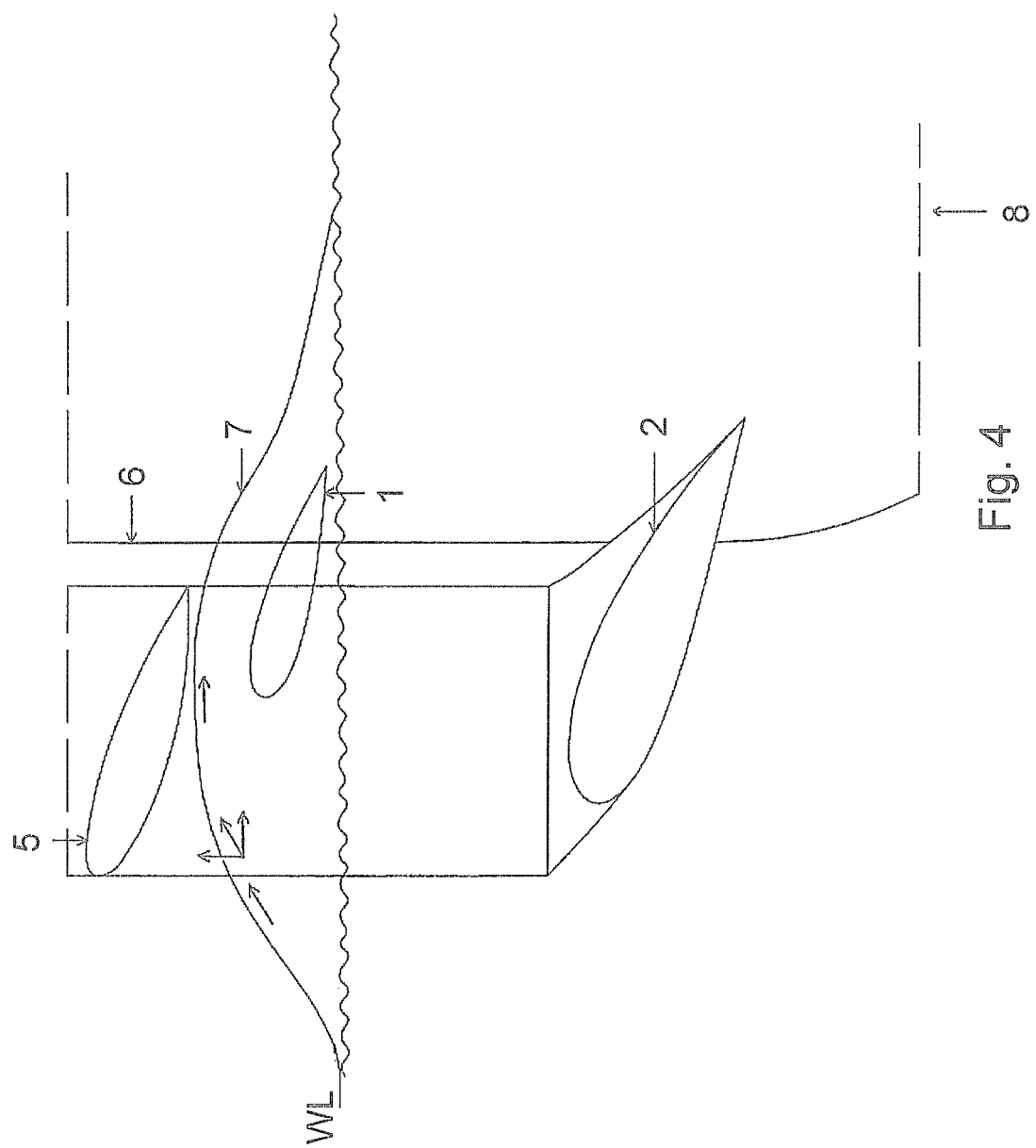
FIG. 4 presents a side view of a part of a vessel bow with the hydrodynamic duct of the present invention, comprising a pair of horizontal wall portions, i.e. a lower and an upper horizontal wall portion, intended to be used particularly for low-speed vessels wherein the upper horizontal wall portion is positioned above the waterline.
Figure 5:
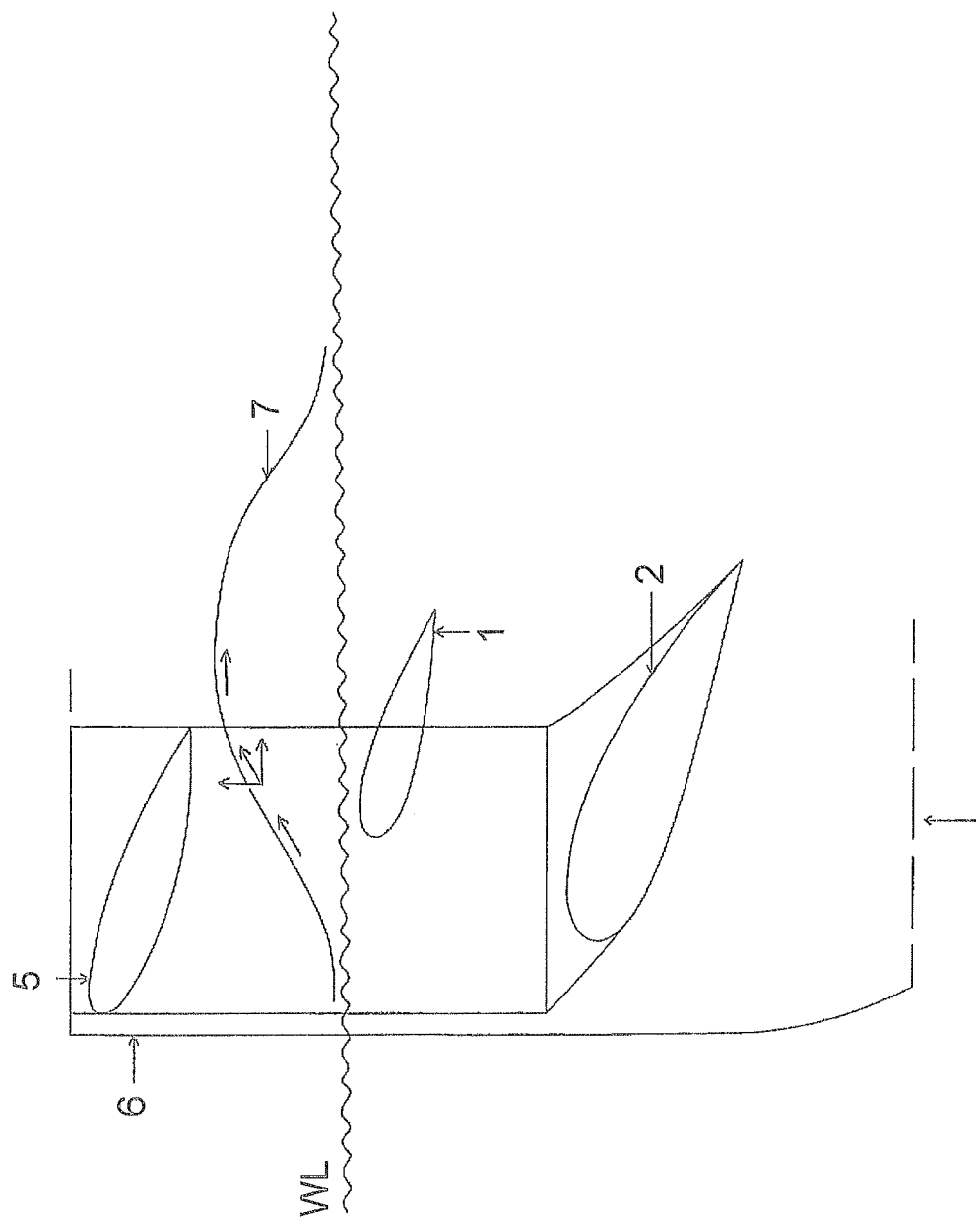
FIG. 5 presents a side view of a part of a vessel bow with the hydrodynamic duct of the present invention, comprising a pair of horizontal wall portions, i.e. a lower and an upper horizontal wall portion, intended to be used particularly for high-speed vessels wherein the upper horizontal wall portion is positioned below the waterline.

FIGS. 4 and 5 present a side view of a part of the bow of a vessel 8 with the hydrodynamic duct of the present invention comprising a lower horizontal wall portion 2 and an upper horizontal wall portion 1, intended to be used particularly for low-speed and high-speed vessels respectively.

FIGS. 4 and 5 illustratively depict a development of the bow wave 7 and it is noted that the upper horizontal wall portion 1 of FIG. 4 for low-speed vessels is positioned above the waterline (WL), whilst the upper wall portion 1 of FIG. 5 for high-speed vessels is positioned below the waterline (WL). In the present invention the low-speed vessels are meant to include vessels with a wide bow configuration, wherein the bow wave is manifested prior, i.e. upstream of the forward perpendicular 6 at the bow, whilst high-speed vessels are meant to include vessels with a narrow bow configuration, wherein the bow wave is manifested onto and after, i.e. downstream the forward perpendicular 6 at the bow. In the aforementioned configurations for low-speed and high-speed vessels respectively, the upper horizontally extending wall portion 1 acts beneficially with a scope of reducing the bow wave in cooperation with the vectors of the sea surface bow wave 7, which, are illustratively shown on the surface of bow wave 7 in FIGS. 4 and 5 analyzed in horizontal and vertical components.

FIGS. 6a-6d and 7a-7d depict illustrative embodiments of the duct of the invention for low-speed and high-speed vessels respectively. The nominal speed selected in designing a vessel is related to the bow geometry and is usually set at low values, by way of example less than 16 knots for vessels that generally have a wide bow configuration, such as bulk carriers, general cargo, tankers, etc., whilst higher nominal speed values, e.g. higher than 16 knots and up to about 30 knots are chosen for vessels that generally have a narrow bow configuration, such as passenger vessels, yachts, or vessels carrying containers.

Figure 6A:
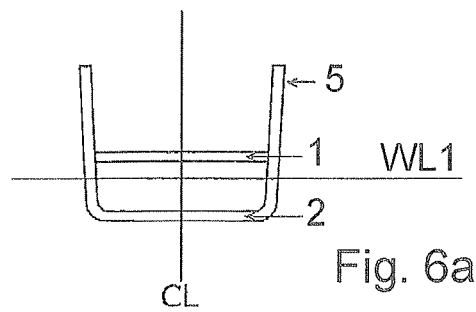
FIGS. 6a-6d show sectional views of the hydrodynamic duct of the present invention in a number of alternative indicative embodiments for installation at the bow of low-speed vessels.
Figure 7A:
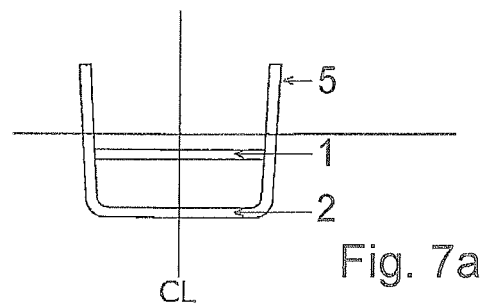
FIGS. 7a-7d show sectional views of the hydrodynamic duct of the present invention in a number of alternative indicative embodiments for installation at the bow of high-speed vessels.

Each of the FIGS. 6a-6d and 7a-7d shows a sectional view of the hydrodynamic duct of the present invention and depicts the center line of the bow (CL), the lateral wall portions 5 at each side of the center line (CL) and indicate the waterline (WL1) attributed to fully loaded vessels (load condition) and the waterline (WL2) attributed to unloaded vessels (unloaded condition). Illustrative embodiments of the duct of the invention are summarized below:

FIG. 6a and FIG. 7a present the duct of the invention indented to be used for vessels in loaded condition of low and high-speed respectively. In these embodiments, management of the pressure exerted onto the bow is undertaken by the immersed lower wall portion 2, whilst surface wave management is undertaken by the upper wall portion 1 that is positioned above the waterline (WL1) of loaded condition for low-speed vessels (FIG. 6a) and below the waterline (WL1) for high-speed vessels (FIG. 7a) respectively. When the vessel is in unloaded condition both horizontally extending wall portions 1 and 2 are situated outside the water and in this condition the duct obviously does not have any effect whatsoever on the navigation parameters of the vessel.

Figure 6B:
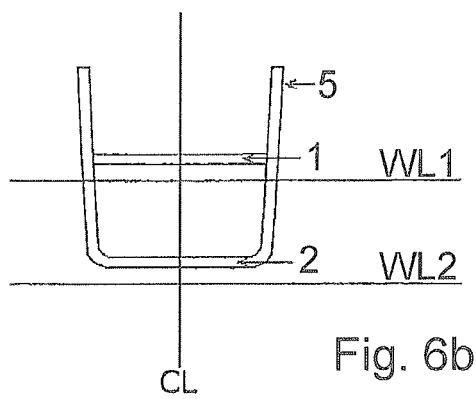
Figure 7B:
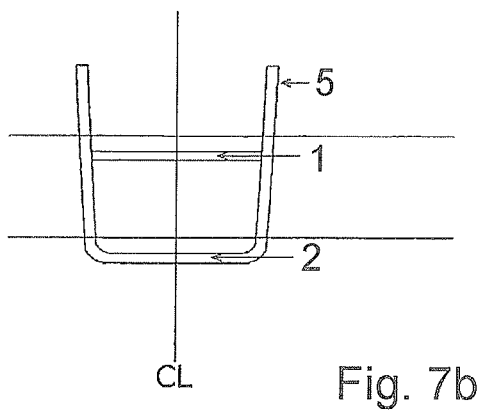

FIG. 6b and FIG. 7b present the duct of the invention indented to be used for vessels in loaded condition of low and high-speed respectively. In these embodiments, management of the pressure exerted onto the bow is undertaken by the immersed lower wall portion 2, whilst surface wave management is undertaken by the upper wall portion 1 that is positioned above and below the waterline (WL1) for vessels of low- and high-speed respectively. When the vessel is in unloaded condition the wall portion 1 is situated outside the water, far above the waterline, whereas the horizontal wall portion 2 is positioned close to, above and below the waterline (WL2) of unloaded condition for low-speed and high-speed vessels respectively. In this embodiment therefore the wall portion 2 undertakes the management of surface wave, and thus the duct of this embodiment is capable of managing the surface wave in both conditions of a loaded and unloaded vessel.

Figure 6C:
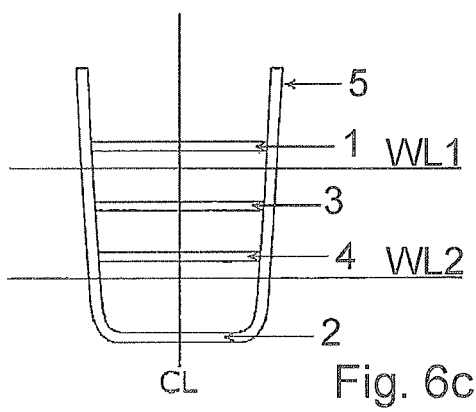
Figure 7C:
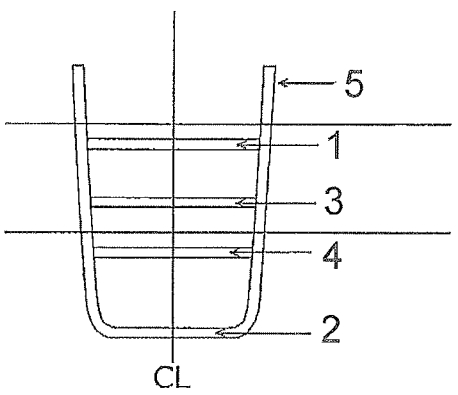

In FIG. 6c and FIG. 7c for vessels of low-speed and high-speed respectively, the duct of the invention can be fully operative in both conditions of an unloaded and of a fully loaded vessel. The duct in this case comprises, in-between the upper and lower wall portions 1 and 2, a pair of intermediate wall portions 3 and 4. The duct in this embodiment is fully operative for a vessel in loaded condition by making use of the horizontally extending wall portions 1 and 3, with wall portion 1 providing management of surface wave and fully immersed wall portion 3 undertaking handling of the pressures exerted by sea flow impacting the bow through the duct. In this case of a vessel in loaded condition, the underlying wall portions 4 and 2 provide an action of counteracting flow turbulence and providing smoother flow streams. The duct of this embodiment remains fully operative for a vessel in unloaded condition by making use of the horizontally extending wall portions 4 and 2, with wall portion 4 providing management of surface wave and fully immersed wall portion 2 undertaking handling of the pressures exerted by sea flow impacting the bow through the duct. In this case of a vessel in unloaded condition, the wall portions 1 and 3 that lie above wall portions 4 and 2, are situated outside the water.

Figure 6D:
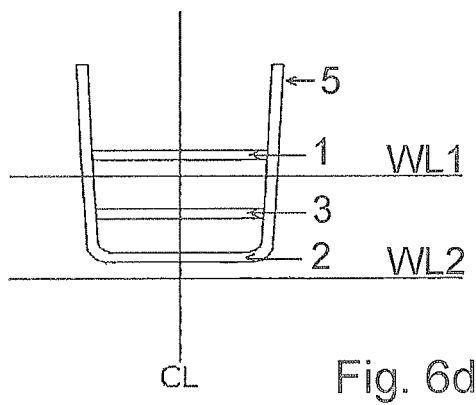
Figure 7D:
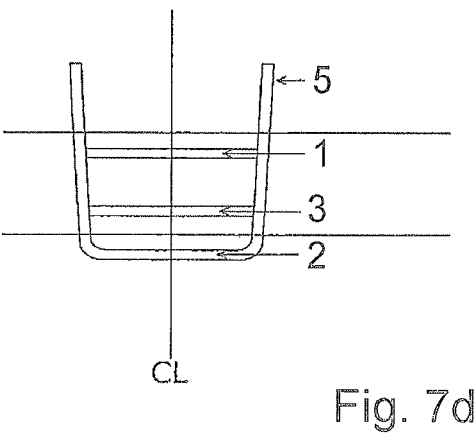

Finally, FIGS. 6*d* and 7*d* depict another embodiment of the duct of the invention as used in low-speed and high-speed vessels respectively. The duct of this embodiment comprises a horizontally extending intermediate wall portion 3, in-between the wall portions 1 and 2. With the vessel in loaded condition, the duct is fully operative with the horizontally extending wall portions 1 and 3 providing the surface wave management and management of the pressures exerted by the flow entering the duct respectively with the underlying wall portion 2 providing counteracting flow turbulence and attaining smoother flow streams. In unloaded condition the wall portions 1, 3 and 2 are situated outside the water for low-speed vessels (FIG. 6*d*) with wall portion 2 being located close to the waterline of unloaded condition (WL2) and undertaking the management of surface wave that is disclosed of the present invention. Respectively in unloaded condition for high-speed vessels (FIG. 7*d*), wall portions 1 and 3 are situated outside the water, whilst wall portion 2 remains immersed in water close to the waterline of unloaded condition (WL2) and undertakes the management of surface wave.

Figure 3:
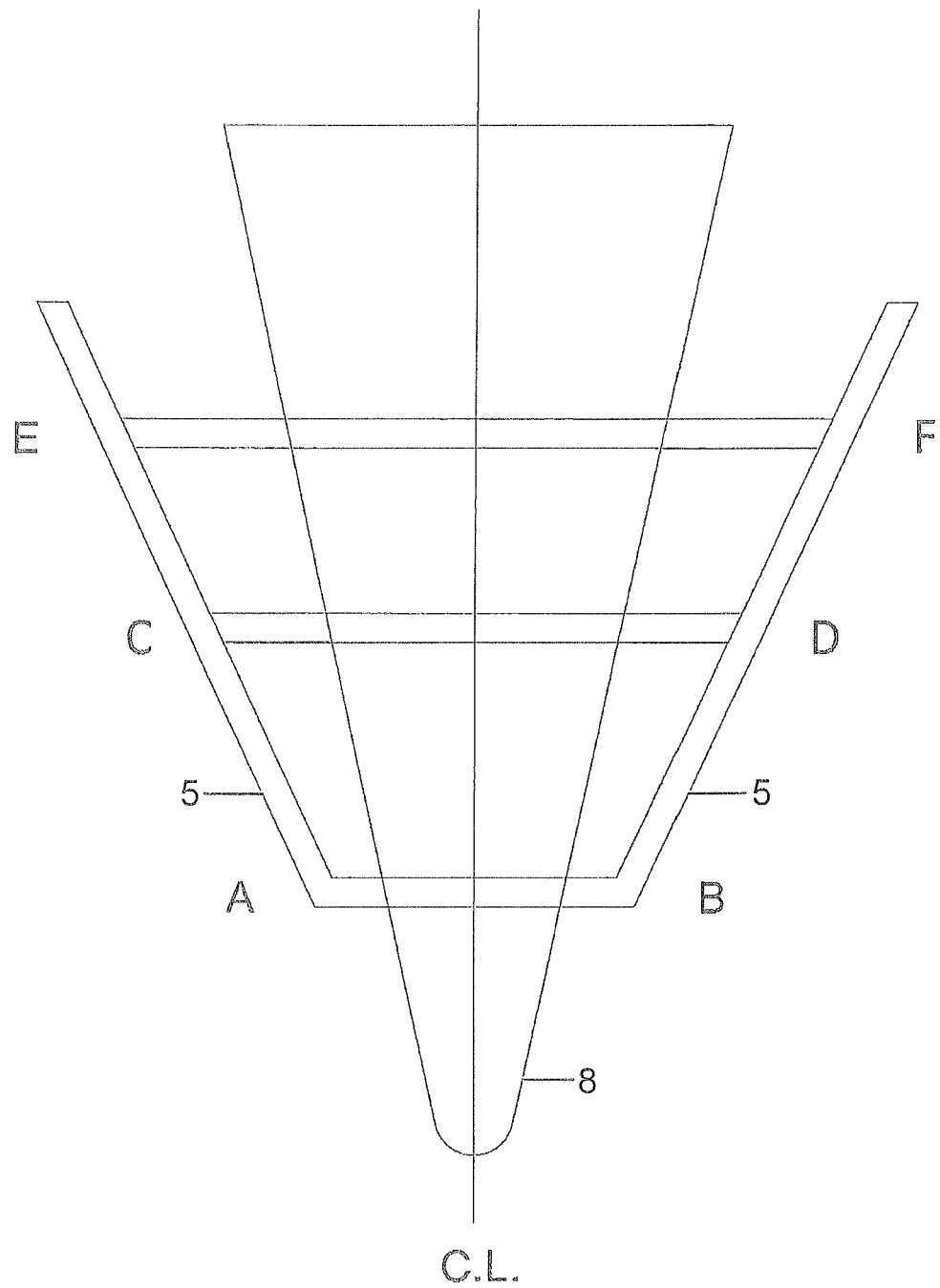
FIG. 3 presents a sectional view of the vessel bow with the hydrodynamic duct of the invention comprising a lower, an upper and an intermediate horizontally extending wall portion and lateral portions connected at the ends of the horizontal wall portions and deviating as they extend upwardly at a constant angle of deviation from the side walls of the bow.

The hydrodynamic duct illustrated in the sectional view of the bow of the vessel of FIG. 3 is of the type shown in the abovementioned FIGS. 6*d* and 7*d* comprising a lower horizontal wall portion (AB), an upper horizontal wall portion (EF) and an intermediate horizontal wall portion (CD), lateral wall portions 5 being connected at the ends of wall portions (AB), (CD) and (EF), wherein these lateral wall portions 5 extend upwardly deviating from the side walls of the bow of the vessel 8 exhibiting a constant angle of deviation. Whilst in accordance with a preferred embodiment of the invention the lateral wall portions 5 are configured so as to follow the configuration of the side walls of the bow thereby extending parallel to the bow side walls, the embodiment illustrated in FIG. 3 with the lateral walls 5 deviating from the bow side walls offers advantageous results in combination with the duct of two or more horizontally extending wall portions, under conditions wherein it is desirable to enhance the flow that passes through the duct and possible undesired loss generating vortices arising under such conditions being due to the deviation are compensated by the strengthened action of the vectors of the extra lengths of the horizontally extending wall portions.

The deviation of the lateral wall portions 5 can be modified so that one part of the lateral wall portions 5 extends at a configuration exhibiting a certain deviation from the side walls of the bow, whilst another part of the lateral wall portions 5 extends at a configuration that maintains their aforementioned parallel orientation to the side walls of the bow. By way of example, parts (AC) and (BD) of the lateral wall portions 5 can follow the configuration of the side walls of the bow, whilst the parts of the lateral wall portions 5 extending above the points (C) and (D) may be arranged to deviate from the side walls of the bow or, vice versa, parts (AC) and (BD) of the lateral wall portions may deviate from the bow side walls whilst parts positioned above the points (C) and (D) follow the configuration of the bow and are maintained parallel to the bow side walls. In general, any combination of deviated orientation and of parallel orientation of the lateral wall portions relatively to the bow side walls is possible and will be preferred under varying circumstances in correspondence with the requirements posed by the specifications and the characteristics of navigation of a vessel. It is herein noted that the aforementioned combinations related to the embodiment depicted in FIG. 6*d* or 7*d*, are similarly applicable in the embodiments of FIG. 6*a* or 7*a*, 6*b* or 7*b* and 6*c* or 7*c*.

Figure 9A:
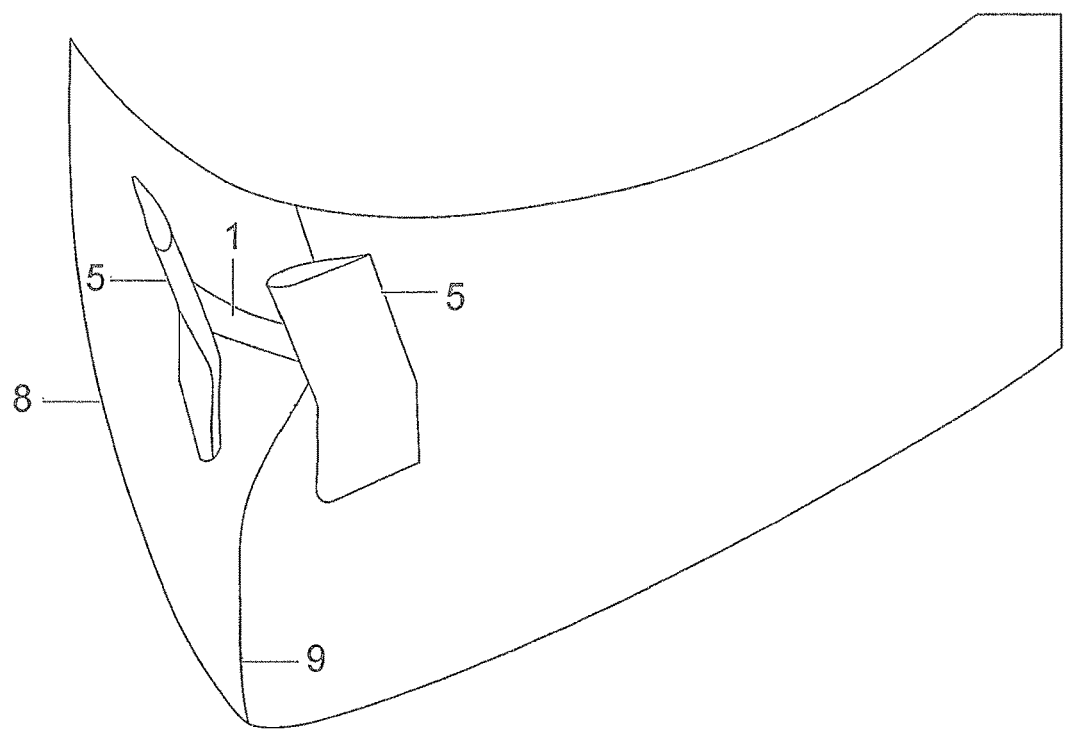
Figure 9B:
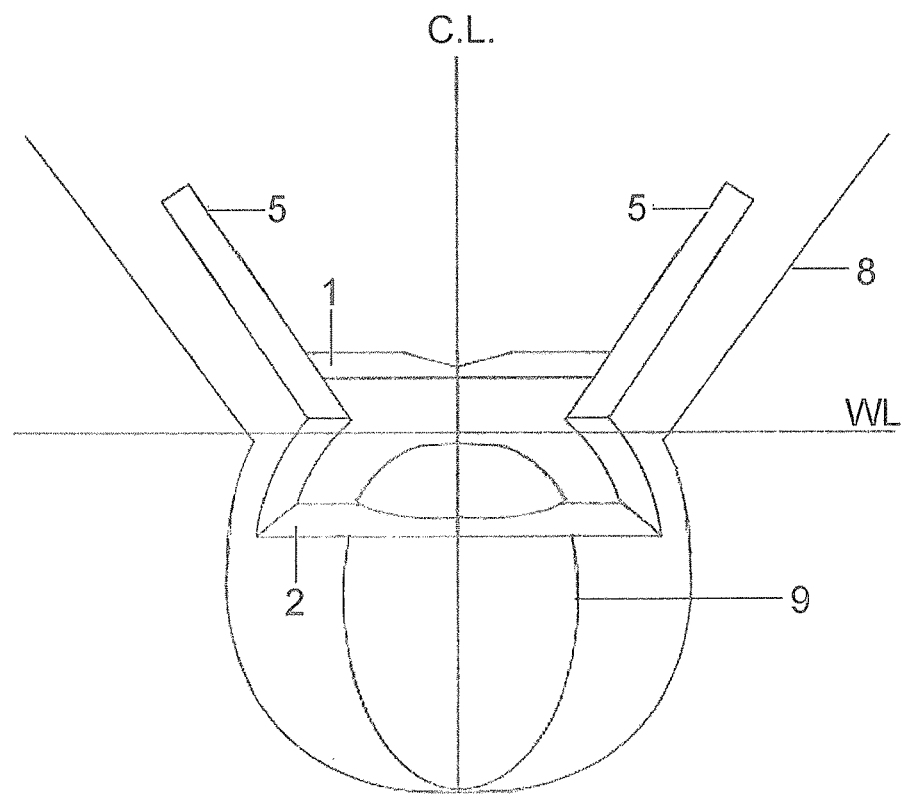
FIG. 9b shows another embodiment of combination of the hydrodynamic duct with a bulbous bow wherein the lower horizontal wall portion extends at a selected height on either side of the bulb body. The upper horizontal surface wave managing wall portion is in either case located above the bulb body in the proximity of the waterline.

FIGS. 9*a* and 9*b* illustrate embodiments of the hydrodynamic duct of the invention mounted onto the bow of vessels in combination with a bulb 9. In particular, FIG. 9*a* shows a perspective view of an embodiment of the invention wherein the hydrodynamic duct is provided in a bulbous bow and the lower horizontal wall portion is the upper surface of the bulb body 9, whereas FIG. 9*b* shows another embodiment of combination of the hydrodynamic duct with a bulbous bow wherein the lower horizontal wall portion 2 extends at a selected height on either side of the bulb body 9. The lateral wall portions 5 extend in either case on either side of the side walls of the bulb 9 and/or of the bow and the upper horizontal surface wave managing wall portion 1 is in either case located above the bulb body 9 in the proximity of the waterline.

It should herein be noted that the description of the invention was presented by reference to illustrative, not restrictive embodiments. Thus, any modification or change relating to shape, size, configuration, dimensions, materials, auxiliary mechanisms and components of construction and assembly, as well as design parameters of the hydrodynamic duct mounted at the bow of a vessel in functional interdependence with different types of vessels having varying bow geometry and varying nominal navigation speeds, are considered part of the aims and scope of the invention, as summarized in the claims below:

The invention claimed is:

1. Vessel with a hydrodynamic duct of flow management at the bow thereof, said duct comprising a horizontal wall portion (2) extending on either side of the centerline (CL) of the bow of the vessel (8) and a pair of lateral wall portions (5), each of the lateral wall portions (5) connected at one end of the horizontal wall portion (2), said lateral wall portions (5) extending upwardly at each side of the bow and forming together with the horizontal wall portion (2) an area of flow within the duct entirely differentiated from the flow outside the duct, wherein:

said duct is further provided with at least one additional horizontal wall portion being arranged to be fixedly positioned at the region of the waterline above said horizontal wall portion (2), said horizontal wall portion (2) being arranged to be fixedly positioned at the bottom of the duct, said at least one additional horizontal wall portion having an airfoil section such that said at least one additional horizontal wall portion is adapted to cooperate with the vectors of the surface waves produced by the sea in order to achieve an increase of the inlet velocity of the flow incident onto the leading edge of said at least one additional horizontal wall portion such that said at least one additional horizontal wall portion produces absorption of wave energy that is produced as a result of increased speed of flow through the leading edge of said additional horizontal wall portion, wherein the combination of said horizontal wall portion (2) at the bottom of the duct with said at least one additional horizontal wall portion at the region of the waterline together with the lateral wall portions (5) that extend upwardly on either side of the bow and are connected at the ends of said horizontal wall portion (2) and at the ends of said at least one additional horizontal wall portion, define a circumferentially closed duct that provides a cumulatively increased reduction of wave making resistances and reduction of the rated horsepower and fuel consumption for the propulsion of the vessel.

2. Vessel with a hydrodynamic duct of flow management at the bow thereof according to claim 1, wherein said at least one additional horizontal wall portion is a horizontal wall portion (1) arranged so as to operate at the region of the waterline of loaded condition (WL1) when the vessel is in loaded condition and adapted to provide management of surface waves, said horizontal wall portion (1) being positioned above said waterline (WL1) for vessels with a wide bow configuration wherein bow waves are manifested upstream and prior to forward perpendicular (6) at the bow, and being positioned above said waterline (WL1) for vessels with a narrow bow configuration wherein bow waves are manifested onto the forward perpendicular (6) at the bow and downstream of the same.

3. Vessel with a hydrodynamic duct of flow management at the bow thereof according to claim 1, wherein said at least one additional horizontal wall portion is a horizontal wall portion (1) arranged so as, whilst the vessel is in unloaded condition, both said horizontal wall portions (1) and (2) are situated outside the water, above the waterline of unloaded condition (WL2) and the duct does not have any effect on the navigation parameters of the vessel.

4. Vessel with a hydrodynamic duct of flow management at the bow thereof according to claim 1, wherein said at least one additional horizontal wall portion is a horizontal wall portion (1) arranged so as, when the vessel is in unloaded condition, the horizontal wall portion (1) is situated outside the water, above the waterline of unloaded condition (WL2) and the horizontal wall portion (2) is positioned at the region of the waterline of unloaded condition (WL2) and undertakes management of surface waves.

5. Vessel with a hydrodynamic duct of flow management at the bow thereof according to claim 1, wherein the hydrodynamic duct comprises an intermediate horizontally extending wall portion (3) in-between said horizontally extending wall portions (1) and (2), and, when the vessel is in loaded condition, the duct operates with:
the horizontally extending wall portion (1) managing the surface waves at the top of the duct, said horizontally extending wall portion (1) being positioned above said loaded condition waterline (WL1) for vessels with a wide bow configuration wherein bow waves are manifested upstream and prior to the forward perpendicular (6) at the bow, and being positioned below said loaded condition waterline (WL1) for vessels with a narrow bow configuration wherein bow waves are manifested onto the forward perpendicular (6) at the bow and downstream of the same;
the intermediate horizontally extending wall portion (3) located in-between said horizontally extending wall portions (1) and (2), being adapted to managing the pressures being exerted at a bottom of the duct, and
the horizontally extending wall portion (2) that is located below said intermediate horizontally extending wall portion (3) being adapted to providing laminar flow regulation.

6. Vessel with a hydrodynamic duct of flow management at the bow thereof according to claim 1, wherein the hydrodynamic duct comprises an intermediate horizontally extending wall portion (3) in-between said horizontally extending wall portions (1) and (2), and, when the vessel is in unloaded condition, the duct operates with the horizontally extending wall portions (1) and (3) situated outside the water and with the horizontally extending wall portion (2) being adapted to provide management of surface waves at the region of the waterline of unloaded condition (WL2), said horizontally extending wall portion (2) being positioned above said unloaded condition waterline (WL2) for vessels with a wide bow configuration wherein bow waves are manifested upstream and prior to the forward perpendicular (6) at the bow, and being positioned below said unloaded condition waterline (WL2) for vessels with a narrow bow configuration wherein bow waves are manifested onto the forward perpendicular (6) at the bow and downstream of the same.

7. Vessel with a hydrodynamic duct of flow management at the bow thereof according to claim 1, wherein the hydrodynamic duct comprises an intermediate horizontally extending wall portion (3) positioned below the horizontally extending wall portion (1) and an additional horizontally extending wall portion (4) positioned below the horizontally extending wall portion (3) and above the horizontally extending wall portion (2), wherein when the vessel is in loaded condition, the duct operates with:
the horizontally extending wall portion (1) managing the surface waves at the top of the duct, said horizontally extending wall portion (1) being positioned above said loaded condition waterline (WL1) for vessels with a wide bow configuration wherein bow waves are manifested upstream and prior to the forward perpendicular (6) at the bow, and being positioned below said loaded condition waterline (WL1) for vessels with a narrow bow configuration wherein bow waves are manifested onto the forward perpendicular (6) at the bow and downstream of the same;
the horizontally extending wall portion (3) being adapted to managing the pressures being exerted at a bottom of the duct and
the horizontally extending wall portion (4) that is located below said horizontally extending wall portion (3) being adapted to providing laminar flow regulation.

8. Vessel with a hydrodynamic duct of flow management at the bow thereof according to claim 1, wherein the hydrodynamic duct comprises an additional horizontally extended wall portion (3) positioned below the horizontally extending wall portion (1) and an additional horizontally extending wall portion (4) positioned below the horizontally extending wall portion (3) in-between said horizontally extending wall portions (3) and (2), wherein, when the vessel is in unloaded condition, the horizontally extending wall portions (1) and (3) are situated outside the water and the duct operates with:
the horizontally extending wall portion (4) managing the surface waves at the top of the duct, said horizontally extending wall portion (4) being positioned above said unloaded condition waterline (WL2) for vessels with a wide bow configuration wherein bow waves are manifested upstream and prior to the forward perpendicular (6) at the bow, and being positioned below said unloaded condition waterline (WL2) for vessels with a narrow bow configuration wherein bow waves are manifested onto the forward perpendicular (6) at the bow and downstream of the same;
the horizontally extending wall portion (2) being adapted to managing the pressures being exerted at a bottom of the duct.

9. Vessel with a hydrodynamic duct of flow management at the bow thereof according to claim 1, wherein the lateral wall portions (5) of the hydrodynamic duct are arranged so as:

- either to follow the configuration of the side walls of the bow of the vessel (8) remaining parallel to them with the trailing edge of the lateral wall portions (5) maintained at a constant equal distance from the side walls of the bow of the vessel (8) at each particular level of the waterline;
- or to deviate from the side walls of the bow of the vessel (8) either at a fixed or at a variable angle of deviation;
- or said lateral wall portions (5) being arranged so that part of the length thereof deviates at a fixed or at a variable angle of deviation along either an upper or a lower portion of the height of the duct, and another part of said lateral wall portions (5) being arranged at said fixed distance from the side walls of the bow of the vessel (8) following the configuration of the side walls of the bow and remaining parallel to them.

* * * * *